(12) United States Patent
Cuvelier et al.

(10) Patent No.: US 7,048,500 B2
(45) Date of Patent: May 23, 2006

(54) SILENCER FOR VENTILATION SYSTEM AND METHODS

(75) Inventors: Leon Robert Cuvelier, Hamme-Mille (BE); Harold Patrick van der Straten Waillet, Huppaye (BE); Paul Gossez, Mont Saint Guibert (BE); Jimmy Vanderlinden, Herent (BE); Hamid Ghotbadinian, Tienen (BE); Erwan Clement, Brussels (BE)

(73) Assignee: Donaldson Company, Inc., Minneapolis, MN (US)

( * ) Notice: Subject to any disclaimer, the term of this patent is extended or adjusted under 35 U.S.C. 154(b) by 126 days.

(21) Appl. No.: 10/791,344

(22) Filed: Mar. 1, 2004

(65) Prior Publication Data

US 2005/0191169 A1    Sep. 1, 2005

(51) Int. Cl.
*F01D 25/00*    (2006.01)

(52) U.S. Cl. .................................. 415/119; 415/169.2

(58) Field of Classification Search ................. 415/119, 415/169.1, 169.2; 181/214, 218, 225, 224; 95/280

See application file for complete search history.

(56) References Cited

U.S. PATENT DOCUMENTS

| | | | |
|---|---|---|---|
| 2,502,545 A | 4/1950 | Wellborn | |
| 2,599,604 A | 6/1952 | Bauer et al. | |
| 3,076,554 A | 2/1963 | Bub | |
| 3,243,943 A | 4/1966 | Getzin | |
| 3,511,337 A | 5/1970 | Pease et al. | |
| 3,631,654 A | 1/1972 | Riely et al. | |
| 3,820,629 A | * 6/1974 | Carlson et al. | 181/290 |
| 3,828,524 A | 8/1974 | Booth et al. | |
| 3,853,529 A | 12/1974 | Boothe et al. | |
| 3,950,157 A | 4/1976 | Matney | |
| 3,953,566 A | 4/1976 | Gore | |
| 4,004,899 A | 1/1977 | Giacovas | |
| 4,065,341 A | 12/1977 | Cub | |
| 4,135,900 A | 1/1979 | Westlin et al. | |
| 4,149,863 A | 4/1979 | Ballard | |
| 4,158,449 A | 6/1979 | Sun et al. | |
| 4,187,390 A | 2/1980 | Gore | |
| 4,204,960 A | 5/1980 | Sugiyama et al. | |
| 4,234,323 A | 11/1980 | Maher | |
| 4,300,918 A | 11/1981 | Cary | |
| 4,443,237 A | 4/1984 | Ulvestad | |
| 4,452,616 A | 6/1984 | Gillingham et al. | |
| 4,504,293 A | 3/1985 | Gillingham et al. | |
| 4,619,675 A | 10/1986 | Watanabe | |

(Continued)

FOREIGN PATENT DOCUMENTS

DE    37 12 113 A1    10/1988

(Continued)

OTHER PUBLICATIONS

"The New GDX™ Self-Cleaning Air Filter from Donaldson." Bulletin 3000-31, 4 pgs.*

(Continued)

*Primary Examiner*—Edward K. Look
*Assistant Examiner*—Richard A. Edgar
(74) *Attorney, Agent, or Firm*—Merchant & Gould PC

(57) ABSTRACT

A silencer for a ventilation system, for example a gas turbine air intake system, includes first and second body sections spaced from each other to define a gas flow path therebetween. Methods of attenuating noise from a gas turbine air intake includes directing air from a dirty air plenum of a gas turbine air intake system through an air flow path defined by first and second body sections.

6 Claims, 6 Drawing Sheets

U.S. PATENT DOCUMENTS

| | | |
|---|---|---|
| 4,652,285 A | 3/1987 | Greene |
| 4,704,143 A | 11/1987 | Percy |
| 4,758,460 A | 7/1988 | Spicer |
| 4,767,427 A | 8/1988 | Barabas |
| 4,769,096 A | 9/1988 | Vander Giessen et al. |
| 4,878,930 A | 11/1989 | Manniso et al. |
| 4,945,125 A | 7/1990 | Dillon et al. |
| 4,969,999 A | 11/1990 | Riddell |
| 5,026,591 A | 6/1991 | Henn et al. |
| 5,066,683 A | 11/1991 | Dillon et al. |
| 5,137,696 A | 8/1992 | Hitachi et al. |
| 5,157,058 A | 10/1992 | Dillon et al. |
| 5,229,078 A | 7/1993 | Haerle |
| 5,266,195 A | 11/1993 | Hopkins |
| 4,395,269 A | 8/1994 | Schuler |
| 5,346,675 A | 9/1994 | Usui et al. |
| 5,350,515 A | 9/1994 | Stark et al. |
| 5,362,553 A | 11/1994 | Dillon et al. |
| 5,374,402 A | 12/1994 | Hitachi et al. |
| 5,397,632 A | 3/1995 | Murphy, Jr. et al. |
| 5,403,367 A | 4/1995 | De Villiers et al. |
| 5,478,372 A | 12/1995 | Stark |
| 5,562,746 A | 10/1996 | Raether |
| 5,632,791 A | 5/1997 | Oussoren et al. |
| 5,653,786 A | 8/1997 | Taylor et al. |
| 5,750,026 A | 5/1998 | Gadkaree et al. |
| 5,772,883 A | 6/1998 | Rothman et al. |
| D396,098 S | 7/1998 | Gillingham et al. |
| 5,792,247 A | 8/1998 | Gillingham et al. |
| 5,820,645 A | 10/1998 | Murphy, Jr. |
| 5,853,439 A | 12/1998 | Gieseke et al. |
| 5,895,574 A | 4/1999 | Friedmann et al. |
| 5,961,696 A | 10/1999 | Gombos |
| 6,123,751 A * | 9/2000 | Nelson et al. ............... 95/268 |
| 6,348,085 B1 | 2/2002 | Tokar et al. |
| 6,605,131 B1 | 8/2003 | Vanderveen et al. |
| 6,802,690 B1 | 10/2004 | Han et al. |
| 6,880,813 B1 * | 4/2005 | Yazici et al. ............... 415/119 |
| 2002/0092423 A1 | 7/2002 | Gillingham et al. |

FOREIGN PATENT DOCUMENTS

| | | |
|---|---|---|
| GB | 726 882 A | 3/1955 |
| GB | 2 103 106 | 2/1983 |
| NL | 1 021 839 C2 | 5/2004 |
| WO | WO 95/05234 | 2/1995 |
| WO | 02/101227 | 12/2002 |

OTHER PUBLICATIONS

"Genuine Duralife™ Filter Cartridges from Donaldson." Bulletin 3000-33, 4 pgs.*

"GDX™ Pulse Cleaning Filter System." Donaldson® Gas Turbine Systems Brochure #3000-46, 4 pgs. (Copyright 1996).

"Spider-Web® Filter Media." Donaldson® Gas Turbine Systems Brochure #3000-35, 4 pgs. (Copyright 1994).

* cited by examiner

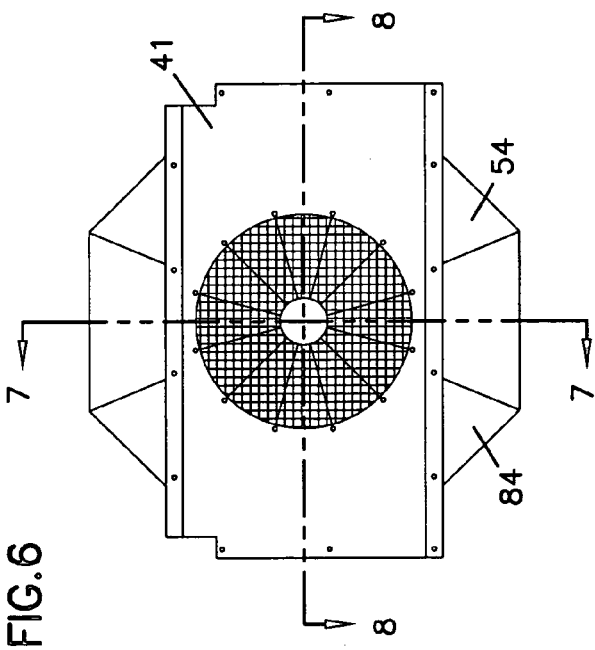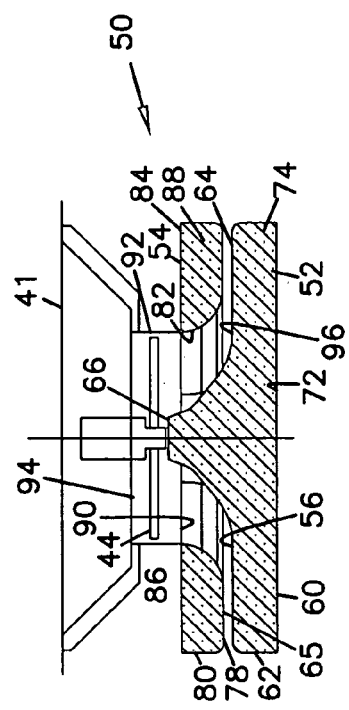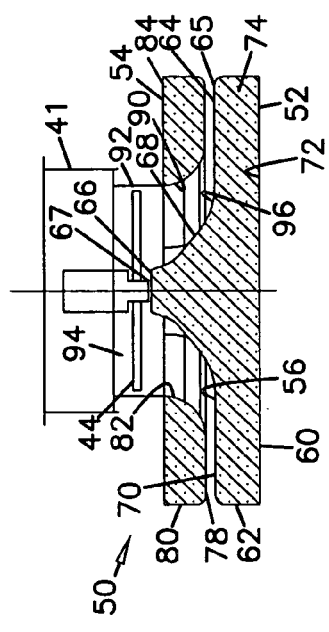

SILENCER FOR VENTILATION SYSTEM AND METHODS

TECHNICAL FIELD

This disclosure relates to silencers for ventilation systems. One example ventilation system discussed herein is an air intake system for a gas turbine, and in particular, a silencer arrangement for use with the air intake system.

BACKGROUND

It is known to provide, in the direction of air flow in front of turbines, and stationary gas turbines in particular, a housing through which the intake air is conducted from the surroundings of the turbine. It is common in such cases to dispose in the housing various devices to perform functions essential for safe operation of the turbine. For example, it is common practice to provide devices for cleaning the intake air and for preventing moisture droplets from entering the turbine. The intake air is typically cleaned by use of several filter elements upstream from the turbine.

In addition, it is common practice to clean the filter elements at regular intervals by blasts of compressed air in order to improve or restore the permeability of the filter elements, which clog with increasing use. The blasts of compressed air typically are directed from the downstream side of the elements toward the upstream side to help to remove dust and debris from the upstream side of the elements. Cleaning the filters with pulse-like thrusts of compressed air generates noise over several frequencies. High frequencies can be absorbed by conventional techniques. Low frequency noise presents unique challenges.

In known systems, there is typically a fan arrangement located below the filter elements. The fan arrangement operates typically during the pulsing of the filter elements with the compressed air. The fan arrangement includes a series of fans that help to exhaust the debris and dust knocked loose from the elements. The fan arrangement, however, allows for noise generated by the pulse system to escape.

Systems and methods for silencing noise from gas turbine air intake systems are desirable.

SUMMARY OF THE DISCLOSURE

A silencer for a ventilation system is provided. A specific example illustrates a silencer for a gas turbine air intake system. The silencer includes first and second body sections spaced from each other to define a gas flow path therebetween.

Preferably, the first body section includes a base, sidewall, and an upper wall. The upper wall has a center region with a concave wall smoothly sloping downwardly terminating at the sidewall. The base, sidewall, and upper wall together form a first body section interior volume, which is, preferably, filled with a packing material.

Preferably, the second body section has a second body section base, outer sidewall, inner sidewall, and upper wall. The base, outer sidewall, inner sidewall, and upper wall together define an interior volume that is filled with a packing material. The second body section also has a center aperture, wherein the inner sidewall lines the center aperture.

Preferably, the upper wall center region of the first body section projects into the center aperture of the second body section. The upper wall of the first body section and the second body section inner sidewall and the second body section base together define the gas flow path.

In preferred systems, a fan is supported by the center region of the upper wall. Further, in example systems, there is a hopper provided adjacent to the fan.

In another aspect, a gas turbine air intake system is provided. The system includes a frame; a plurality of filter elements supported by the frame; a reverse-pulse cleaning system oriented to periodically direct pressurized fluid into the filter elements through a downstream side; a fan arrangement supported by the frame; and a silencer arrangement supported by the frame and in gas flow communication with the fan arrangement. The silencer arrangement includes first and second body sections spaced from each other to define a gas flow path therebetween.

In another aspect, a method of attenuating noise from a gas turbine air intake system is provided. The method includes, in normal operation, directing air from a dirty air plenum of a gas turbine air intake system through an air flow path defined by first and second body sections.

BRIEF DESCRIPTION OF THE DRAWINGS

FIG. 5 is a perspective view of one embodiment of a hopper, fan, and silencer arrangement, constructed according to principles of this disclosure;

FIG. 6 is a top plan view of the arrangement of FIG. 5;

FIG. 7 is a schematic, cross-sectional view of the arrangement depicted in FIG. 6, the cross-section being taken along the line 7—7 of FIG. 6;

FIG. 8 is a schematic, cross-sectional view of the arrangement of FIG. 6, the cross-section being taken along the line 8—8 of FIG. 7;

DETAILED DESCRIPTION

A. Overview of System

Figure 1:
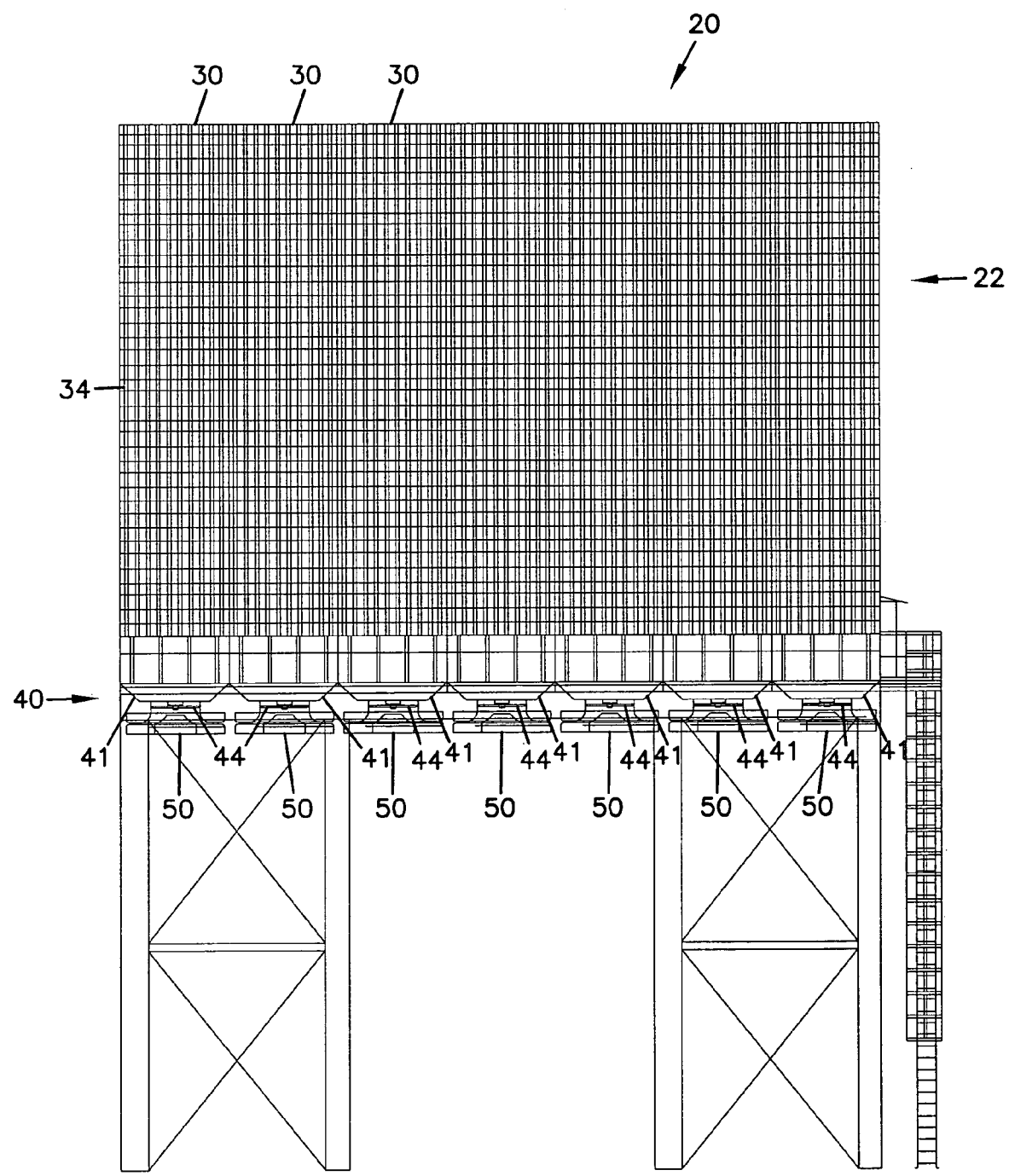
FIG. 1 is a schematic, front elevational view of a gas turbine air intake system constructed according to principles of this disclosure.
Figure 3:
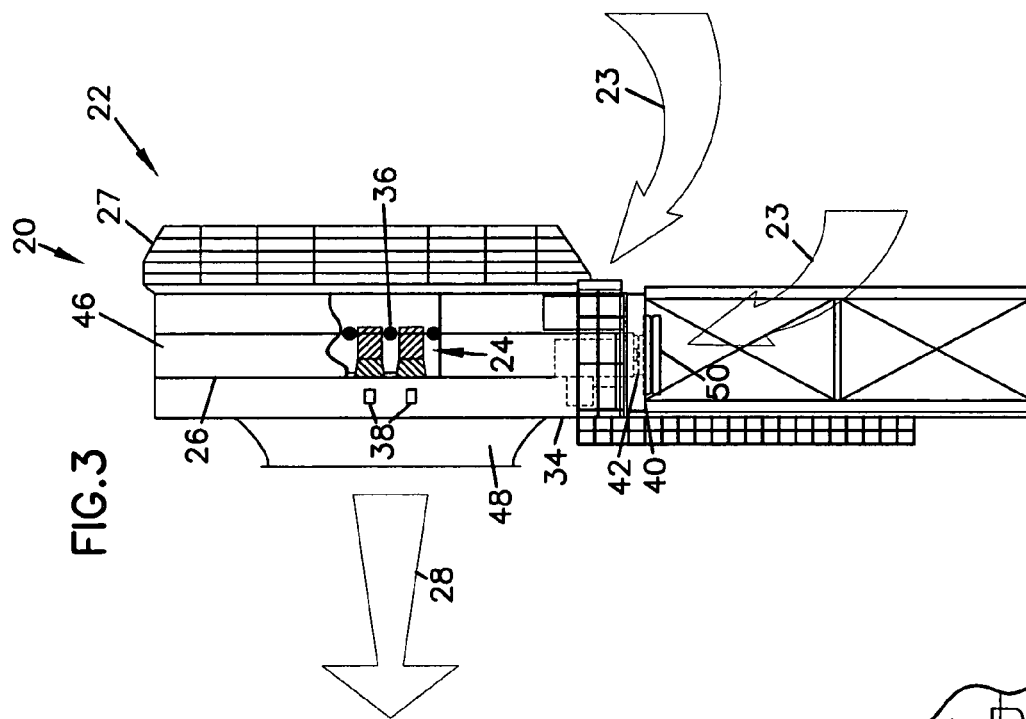
FIG. 3 is a schematic, side elevational view of the system of FIGS. 1 and 2 but showing the system during bypass operation.
Figure 2:
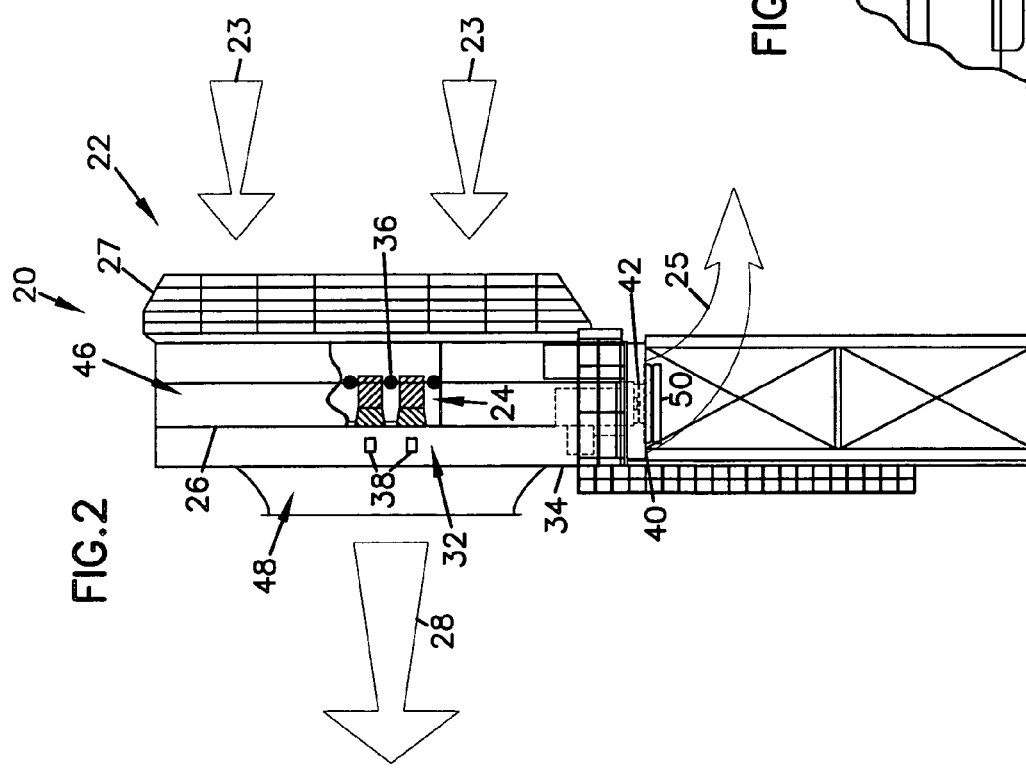
FIG. 2 is a schematic, side elevational view of the system depicted in FIG. 1 and shown during normal operation.
Figure 10:
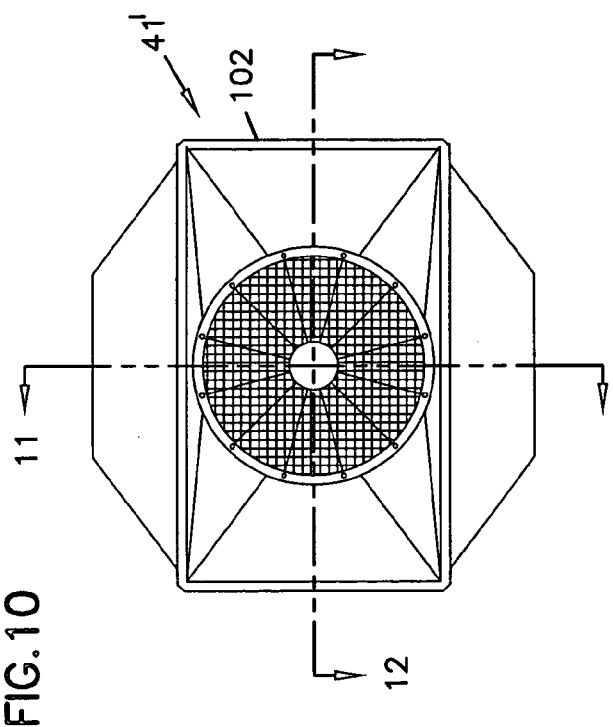
FIG. 10 is a top plan view of the arrangement of FIG. 9.
Figure 9:
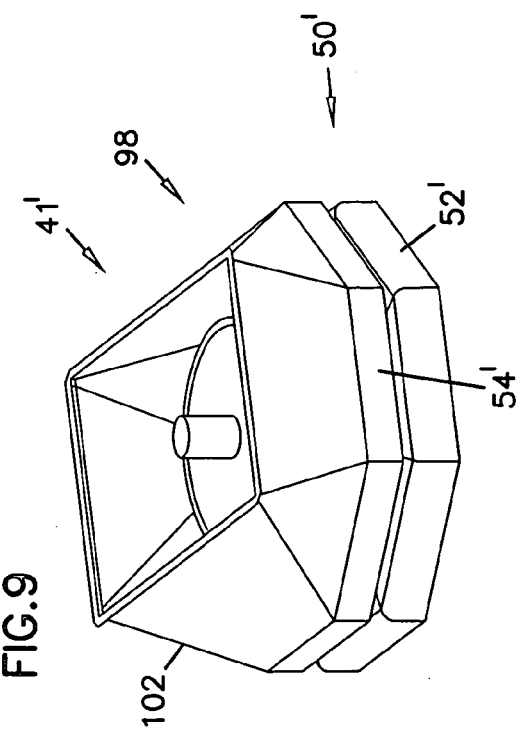
FIG. 9 is a second embodiment of a hopper, fan, and silencer arrangement constructed according to principles of this disclosure.

The methods of use, arrangements, and constructions disclosed herein are useable with a variety of systems. FIGS. 1–3 depict one example system. In this case, the example system shown is a gas turbine system. The gas turbine air intake system is shown schematically in FIGS. 1–3 at reference numeral 20.

In FIG. 2, gas, such as air, is shown drawn into an air intake system 22 at arrows 23. The air intake system 22 includes a hood 27 and a plurality of gas filter elements 24. The plurality of gas filter elements 24 are held within a tube sheet 26. The tube sheet 26 divides system 22 into a dirty air plenum 46, upstream of the tube sheet 26, and a clean air plenum 48, downstream of the tube sheet 26. The air is cleaned with the filter elements 24. After cleaning, the air flows downstream at arrows 28 and into a gas turbine generator, where it is used to generate power. It should be understood that in FIGS. 1–3, only a portion of the air intake system 22 is depicted. This is for purposes of clarity and explanation.

FIG. 1 shows a front elevational view of the air intake 22. Several filter elements 24 (FIG. 2) are used and arranged in columns 30. After a period of use, the pressure drop across the filter elements 24 will increase due to the collection of impurities. The filter elements 24 are periodically cleaned by directing a flow of higher pressure fluid (such as a pulse of compressed gas) into the filter elements 24 in a direction from the downstream side of the filter element to the upstream side of the filter element 24. This will remove at least some of the contaminant and particulate matter from the filter element 24 and reduce the restriction across the filter elements 24. Referring again to FIG. 2, a reverse-pulse cleaning system 32 is provided in the air intake system 22. The reverse-pulse cleaning system 32 is mounted on the frame 34 of the air intake system 22. The reverse-pulse cleaning system 32 typically includes a manifold 36 in communication with a nozzle arrangement 38. The compressed air is directed by the manifold 36 into the nozzles 38. The nozzles 38 direct the compressed air into individual filter elements 24 on their downstream sides. Dirt and debris is knocked loose from the upstream side of the filter elements 24, where it falls by gravity to a hopper arrangement 40. In the embodiment of FIG. 1, it can be seen that the hopper arrangement 40 includes one hopper 41 for each column 30. In other embodiments, the hopper arrangement can be configured to correspond to two or more columns.

Figure 4:
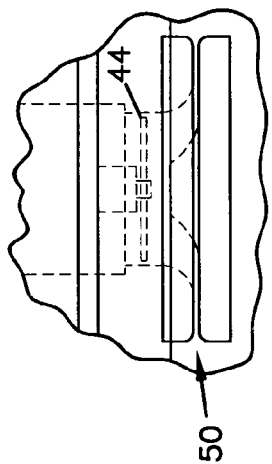
FIG. 4 is an enlarged, schematic side elevational view of a fan and silencer arrangement constructed according to principles of this disclosure.

The air intake system 22 also includes a fan arrangement 42. The fan arrangement 42, in the embodiment depicted, includes a fan 44 (FIG. 4) located below the hopper arrangement 40. In the preferred embodiment shown, there is one fan 44 corresponding to each hopper 41.

When the reverse pulse cleaning system 32 is operating, the fan 44 that corresponds to the column 30 being reverse-cleaned operates. The fan 44 helps to draw out air from the dirty air plenum 46. The air is exhausted from the fan 44 at arrow 25.

FIG. 2 depicts the gas turbine system 20 in normal operation. "Normal operation" is defined as the air flowing at arrows 23 into the dirty air plenum 46, through the filter elements 24, and into the clean air plenum 48. Dirty air is exhausted through the hopper 41 and fan 44 at arrow 25. FIG. 3 shows a bypass condition of the gas turbine system 20. In FIG. 3, the air intake 22 is clogged for some reason, such as icing. In this condition, the combustion air is allowed to full bypass the hood 27. The intake air is rather directed through the fan arrangement 42 and hopper arrangement 40. From there, the intake air is directed through the filter elements 24 and into the clean air plenum 48.

Depicted at 50 is an embodiment of a silencer arrangement. In FIG. 1, it can be seen that there is a silencer arrangement 50 corresponding to each fan 44. In general, the silencer arrangement 50 reduces the noise emitted by the fan 44, the turbine, and the reverse-pulse cleaning system 32. The noise is reduced by the silencer arrangement to a level below 85 dBA. The silencer arrangement 50 allows for the air intake system to operate in both the normal operation (FIG. 2) as well as the bypass operation (FIG. 3).

B. Example Embodiments of a Silencer Arrangement

In reference first to FIGS. 5–8 and 13, the silencer arrangement 50 is depicted with a first embodiment of a typical hopper 41. The hopper 41 can have any operable shape. In FIGS. 5–8, the hopper 41 is viewable arranged over the silencer arrangement 50. In FIGS. 7 and 8, the fan 44 can be seen.

In the embodiment shown, the silencer arrangement 50 includes a first body section 52 and a second body section 54 spaced from each other to define a gas flow path 56 therebetween. The first body section 52, in the embodiment shown, is on the bottom of the arrangement, while the second body section 54 is oriented above or over the first body section 52. In general, the silencer arrangement 50 has a pancake-like shape. In other words, the silencer arrangement 50 is generally flat. In the illustrated embodiment, the arrangement 50 has an outermost width dimension being at least five times greater than a height dimension. The outermost width dimension will depend upon the outlet dimension of the duct. The height will depend upon the desired sound attenuation properties. Other ratios of width to height are possible.

In the embodiment shown, the first body section 52 includes a base 60. The base 60, in the embodiment shown, is the lowermost portion of the silencer arrangement 50. In the embodiment of FIGS. 5–8, the base 60, as well as the overall first body section 52, has a polygon shape. In particular, the embodiment has an octagon shape. Extending from the base 60 is a sidewall 62. The sidewall 62, in normal orientation, will be in a vertical plane and will form the sides of the polygon. The sidewall 62, in the embodiment shown, is generally orthogonal to the base 60. Extending from the sidewall 62 is an upper wall 64. The upper wall 64, in preferred embodiments, comprises an acoustically permeable membrane 65. The upper wall 64 has a center region 66 that is taller than all other portions of the upper wall 64. The center region 66 functions to support a fan blade fixation core 67. The upper wall 64 is symmetrical so that the center region 66 is in the geometric center of the upper wall 64. The upper wall 64 has a concave portion 68 that smoothly slopes downwardly from the center region in a direction toward the sidewall 62. In the embodiment shown, the upper wall 64 has a planar portion 70 that joins the sidewall 62 to the concave portion 68. One objective of this design is to direct air flow aerodynamically, while offering acoustic absorption.

In FIGS. 7 and 8, it can be seen that the base 60, sidewall 62, and upper wall 64 together form an interior volume 72 for the first body section 52. Located within the interior volume 72 is a first region of packing material 74. The packing material 74, in the embodiment shown, is pressed against the base 60, sidewall 62, and upper wall 64. In preferred embodiments, the packing material 74 comprises an absorbent material such as fiberglass packed within plastic bags. The plastic bags protect the fiberglass against rain, dust, snow, or other weather variations. It is, of course, optional to pack the fiberglass in plastic bags. There can be improved silencer performance without the use of plastic bags. In certain preferred embodiments, the fiberglass will be in a density of 80 kg/m$^3$.

Still in reference to FIGS. 5–8, the second body section 54 is depicted oriented above and spaced from the first body section 52. The second body section 54 has a second body section base 78, an outer side wall 80, an inner side wall 82, and an upper wall 84. The second body section 54 defines a center aperture 90. The aperture 90 operates as a receiving opening for hopper 41. The inner side wall 82 lines the center aperture 90. As can be seen in FIGS. 5 and 6, the second body section 54 also has the shape of a polygon.

The second body section base 78, outer sidewall 80, inner sidewall 82, and upper wall 84 together define a second body section interior volume 86. There is a second region of packing material 88 located within the interior volume 86 and pressed against the second body section base 78, outer sidewall 80, inner sidewall 82, and upper wall 84. As with the first packing material 74, the second packing material 88 preferably comprises fiberglass, such as 80 kg/m$^3$. The embodiment shown has the fiberglass packed in a sealed plastic bag, but need not be in a plastic bag.

In FIGS. 7 and 8, it can be seen that the fan 44 is supported by the center region 66 of the upper wall 64 of the first body section 52. The first body section 52 is attached to the second body section 54 by brackets or adjustable tie rods, and the overall arrangement 50 is linked by a frame to column 30 (FIG. 1). As can be seen in FIGS. 7 and 8, the hopper arrangement 40 is oriented above the second body section 54. The hopper arrangement 44 includes the hopper 41 connected to a fan housing 92. The fan housing 92 is tubular and has an inner volume 94. The second body section 54 is secured to the fan housing 92 by extending through the second body section center aperture 90. The first body section 52 is oriented relative to the fan housing 92 such that the center region 66 extends into the inner volume 94 of the fan housing 92. In this manner, the fan 44 is housed within the fan housing 92 and supported by the first body section 52.

As can be seen in FIGS. 7 and 8, the gas flow path 56 is defined by the upper wall 64 of the first body section 52 and the inner sidewall 82 of the second body section 54 and the base 78 of the second body section 54. By directing air flow this gas flow path 56, sound pressure levels are reduced because of the geometry of the gas flow path 56 as well as the absorbent packing regions 74, 88.

Preferably, the first body section 52 is made of a heavy steel, such as 3–5 mm steel to prevent transmission through the body section 52. The depth of the packing material 74, 88 is generous (about 200–300 mm) such that the attenuation on the low frequency noise is optimized.

The spacing between the first body section 52 and second body section 54 forming the gas flow path 56 is preferably constant. The ratio of the spacing relative to the length will determine the attenuation characteristics. In one example, the length of the gas flow path 56 is at least 10 mm and not greater than 100 mm. In other embodiments, the length of the gas flow path could be larger than 100 mm depending upon system characteristics and desired sound attenuation.

As can be seen in FIGS. 7 and 8, in the gas flow path 56 there is an elbow 96. The elbow is the intersection between where the gas exits the fan 44 and where the gas exits the silencer arrangement 50. The elbow 96 further helps sound attenuation, particularly at low frequency.

Because of the shape of the silencer arrangement 50, the noise is distributed all around the perimeter of the silencer arrangement 50. This reduces the sound pressure level of the listener because only part of the sound pressure level can be felt by the listener.

Preferably, the gas flow path 56 is lined with a perforated, non-heat conductive liner, such as a perforated plastic liner. This will reduce a risk of icing.

Attention is now directed to FIGS. 9–12. A silencer arrangement 50' is illustrated with a second embodiment of a hopper arrangement 40. The hopper arrangement 40, in this embodiment, has additional attenuation structure 98. In the embodiment of FIGS. 9–12, the silencer arrangement 50' is the same as described with respect to FIGS. 5–8. In this embodiment, however, to help with further attenuation, the attenuation structure 98 on the hopper 41' includes a wall 102 forming a plurality of chambers 104 surrounding the fan 44'. The chambers 104 are preferably filled with packing material, such as fiberglass. The hopper wall 102 is preferably made from an acoustically permeable material, such as thin rubber, plastic, or micro-perforated materials to help the absorption of noise in the dirty air plenum.

Figure 12:
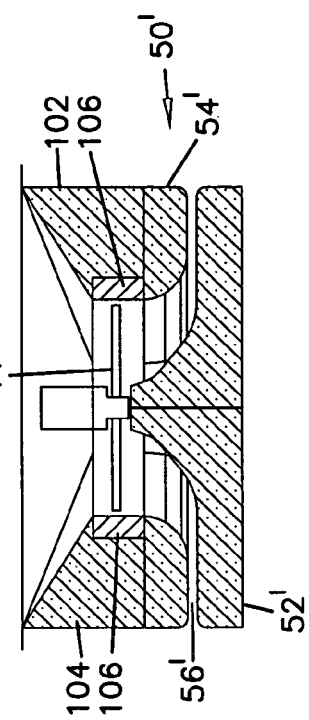
FIG. 12 is a schematic, cross-sectional view of the arrangement depicted in FIG. 10, the cross-section being taken along the line 12—12 of FIG. 10.
Figure 11:
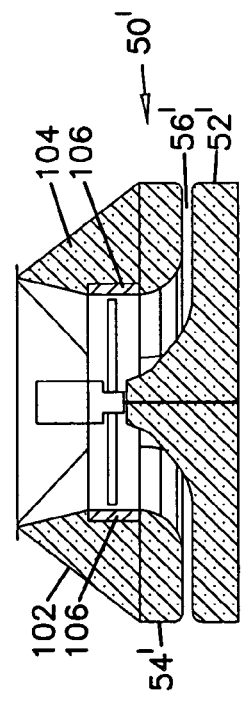
FIG. 11 is a schematic, cross-sectional view of the arrangement in FIG. 10, the cross-section being taken along the line 11—11 of FIG. 10.
Figure 13:
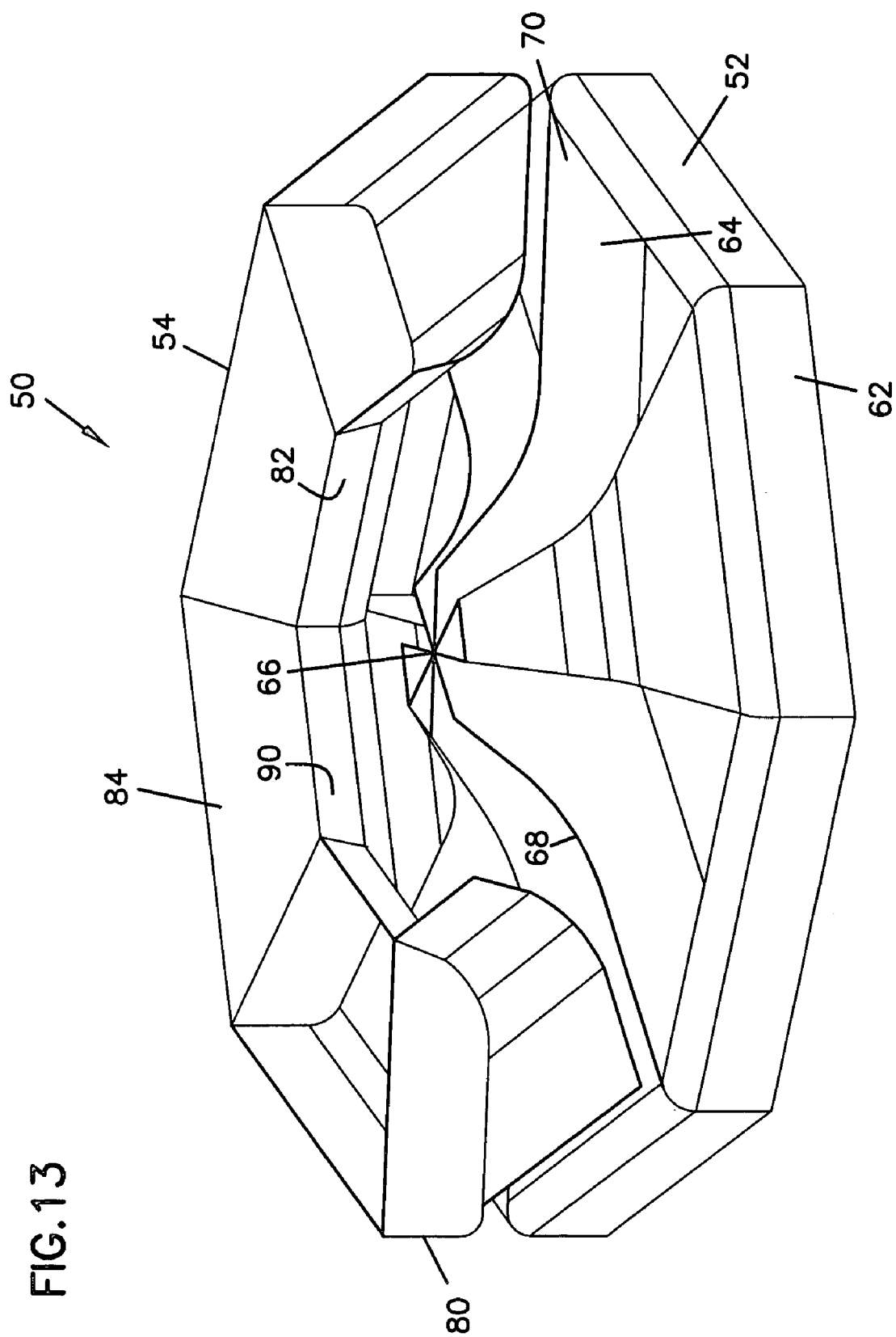
FIG. 13 is a schematic, perspective view with portions broken away of the silencer arrangement of FIGS. 5 and 9.

In reference to FIGS. 11 and 12, in this embodiment, there is, further, a plurality of resonator chambers 106 circumscribing the fan 44'. In this embodiment, the resonator chambers 106 can be filled with a packing material, such as a low density absorption acoustic material. The resonator chambers 106 help to attenuate some of the noise generated by the fan 44'. The resonator chambers 106 are also helpful in attenuating reverse-pulse noise and turbine noise. Some embodiments may use: only chambers 104 (without chambers 106); only chambers 106 (without chambers 104); or use both chambers 104 and 106 (as illustrated).

All of the parts of the silencer arrangement 50' can be covered with a protective sheet, such as a thin plastic sheet, preformed in size so that dirt will not affect the long term attenuation. In addition, the fan 44' can be constructed of perforated material such that the fan noise can be further reduced.

In use, the silencer arrangement 50 has advantages because it fits in a shallow space under the columns of filter arrangements 24. Each one of the silencers 50 has a height not greater than 650 mm and a length of about 2200 mm. The silencer arrangement 50 also allows for air to enter the gas flow path 56 opposite of the direction of fan flow in order to allow the gas turbine air intake 22 to operate in its bypass mode (FIG. 3) in case of inlet blockage due to icing. The silencer arrangement 50 helps to reduce the perceived noise by the listener because the noise is directed in a circular orientation in a horizontal plane that is 90° from the listener. The silencer arrangement 50 also is effective at noise attenuation at both high and low frequency to reduce the sound pressure level below 60 dBA impulse at one meter. The shape of the silencer arrangement 50 helps to exploit the natural velocity vectors of the fan 44.

C. Experimental Data

Figure 14:
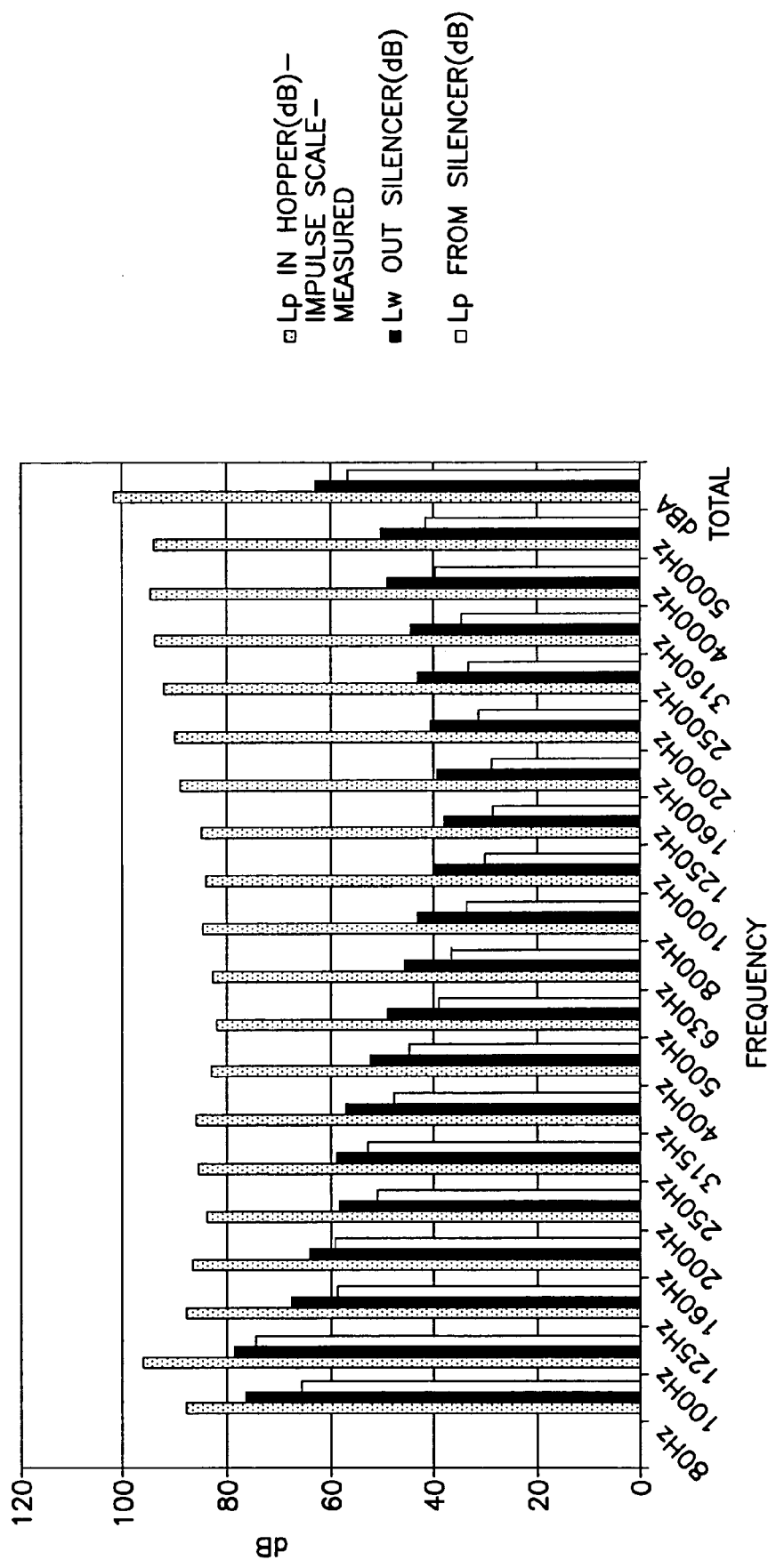
FIG. 14 is a table showing results of an experiment.

Experiments were conducted with the fan silencer arrangement 50. The results are shown in FIG. 14. The unit test is the type shown in FIGS. 5–8. In particular, the unit had a gas flow path 56 having a height of 60 mm, a center aperture 90 of 800 mm, and an octagonal shape circumscribing a diameter of 2200 mm. Packing material of glass wool having a density of 80 kg/m$^3$ was used. The test system included seven columns 30 of air filter elements (arranged in 25 rows). Each pulse in the reverse-pulse cleaning system 32 had one valve.

The three bars on FIG. 14 show the following. The leftmost bar is the sound pressure Lp in at the hopper arrangement, measured and read on an impulse scale (dB); the middle bar is the calculated sound power Lw-out output of the silencer arrangement 50 based on measured transmission loss; and the third bar is the calculated sound pressure Lp-1m at one meter from the silencer arrangement 50. The last arrays shown in FIG. 14 (at the far right) are the calculated totals in dBA impulse. That is, it is the aggregate sound (across all frequencies) and the results sound pressure level.

The measured Lp-in in represents that pulse noise pressure level measured at the hopper arrangement. The Lw-out is the remaining noise power emitted at the exit of the silencer arrangement 50. The Lw-out is calculated by deducting the measure insertion loss of the tested silencer arrangement. The Lp-1m is the noise pressure felt by the listener located at distance of one meter in the horizontal axis of the exit of the silencer arrangement.

As can be seen from the table, the results calculated in the far right array show that a total pressure level by a listener standing one meter away from the silencer arrangement is about 58 dBA, versus the sound at the hopper of over 100 dBA. This total is felt when the listener is at the horizontal axis of the exit of the silencer arrangement. The total pressure level measured from underneath the silencer arrangement (rather than at the horizontal axis) would be even lower. It is noted that the pressure level reductions achieved by the disclosed silencer arrangement 50 are attained without affecting the performance of the fan.

The results show that the silencer 50 decreases the sound pressure level, emitting from the silencer 50 and as perceived by a listener standing one meter away. The silencer 50, in the embodiment tested, was more effective at reducing sound pressure level at frequencies of 250 Hz and higher. The sound pressure level to a listener standing one meter away gradually decreases at the frequency level beginning at 315 hz until 2000 hz. It can be seen, however, that the silencer was effective at reducing sound pressure level to a listener one meter away across all measured frequencies.

What is claimed is:

1. A silencer comprising:
 (a) a first body section including a base, sidewall, and an upper wall;
  (i) the upper wall having a center region with a concave wall smoothly sloping downwardly terminating at the sidewall;
  (ii) the sidewall joining together the base and the upper wall;
  (iii) the base, sidewall, and upper wall together forming a first body section interior volume;
  (iv) a first region of packing material contained within a protective film being within the interior volume and pressed against the base, sidewall, and upper wall;
  (v) the base, sidewall, and upper wall comprising steel;
 (b) a second body section having a second body section base, outer sidewall, inner sidewall, and upper wall;
  (i) the second body section base, outer sidewall, inner sidewall, and upper wall together defining a second body section interior volume;
  (ii) the second body section having a center aperture, with the inner sidewall lining the center aperture;
  (iii) a second region of packing material contained within a protective film being within the second body section interior volume;
 (c) a frame arrangement including an outer tubular housing with an inner volume;
  (i) the second body section being secured to the frame arrangement with the outer tubular housing extending through the second body section center aperture;
  (ii) the first body section being oriented relative to the frame arrangement such that the center region of the upper wall extends into the inner volume of the outer tubular housing; and
  (iii) the upper wall of the first body section and the second body section inner sidewall and the second body section base together defining a gas flow path from the inner volume of the tubular housing;
 (d) a fan supported by the center region of the upper wall; the fan being within the inner volume of the tubular housing; and
 (e) a hopper including a plurality of chambers surrounding the fan; the chambers having a region of packing material therein.

2. A gas turbine air intake system comprising:
 (a) a frame;
 (b) a plurality of filter elements supported by the frame; the filter elements having an upstream portion and a downstream portion;
  (i) the upstream portion of the filter elements being located in a dirty air plenum, and the downstream portion of the filter elements being located in a clean air plenum;
 (c) a reverse-pulse cleaning system oriented to periodically direct pressurized fluid into the filter elements through the downstream portion;
 (d) a fan arrangement in gas flow communication with the dirty air plenum; and
 (e) a silencer arrangement supported by the frame and in gas flow communication with the fan arrangement;
  (i) the silencer arrangement including first and second body sections spaced from each other to define a gas flow path therebetween;
  (ii) the first body section includes a base, sidewall, and an upper wall; with the upper wall having a center region with a concave wall smoothly sloping downwardly terminating at the sidewall; the base, sidewall, and upper wall together forming a first body section interior volume; and a first region of packing material being within the interior volume and pressed against the base, sidewall, and upper wall;
  (iii) the second body section has a second body section base, outer sidewall, inner sidewall, and upper wall that together define a second body section interior volume; the second body section having a center aperture with the inner sidewall lining the center aperture; and a second region of packing material being within the second body section interior volume; and where the upper wall center region of the first body section projects into the center aperture of the second body section;
  (iv) the upper wall of the first body section and the second body section inner sidewall and the second body section base together define the gas flow path;
 (f) a hopper arrangement between the fan arrangement and the silencer arrangement; wherein
 the silencer arrangement permits gas flow in first and second conditions;
  (i) in a first condition, gas flows from the dirty air plenum, through the silencer arrangement, and to external atmosphere; and (ii) in a second condition, gas flows from external atmosphere, through the silencer arrangement, and to the dirty air plenum.

3. A gas turbine air intake system comprising:
(a) a frame;
(b) a plurality of filter elements supported by the frame; the filter elements having an upstream portion and a downstream portion;
   (i) the upstream portion of the filter elements being located in a dirty air plenum, and the downstream portion of the filter elements being located in a clean air plenum;
(c) a reverse-pulse cleaning system oriented to periodically direct pressurized fluid into the filter elements through the downstream portion;
(d) a fan arrangement in gas flow communication with the dirty air plenum; and
(e) a silencer arrangement supported by the frame and in gas flow communication with the fan arrangement;
   (i) the silencer arrangement including first and second body sections spaced from each other to define a gas flow path therebetween;
   (ii) the first body section includes a base, sidewall, and an upper wall; with the upper wall having a center region with a concave wall smoothly sloping downwardly terminating at the sidewall; the base, sidewall, and upper wall together forming a first body section interior volume; and a first region of packing material being within the interior volume and pressed against the base, sidewall, and upper wall;
   (iii) the second body section has a second body section base, outer sidewall, inner sidewall, and upper wall that together define a second body section interior volume; the second body section having a center aperture with the inner sidewall lining the center aperture; and a second region of packing material being within the second body section interior volume; and where the upper wall center region of the first body section projects into the center aperture of the second body section;
   (iv) the upper wall of the first body section and the second body section inner sidewall and the second body section base together define the gas flow path;
(f) a hopper arrangement between the fan arrangement and the silencer arrangement; wherein
the hopper arrangement includes a plurality of chambers surrounding the fan arrangement; the chambers having a region of packing material therein.

4. A gas turbine air intake system according to claim 3 wherein:
(a) said hopper arrangement includes a plurality of hoppers supported by the frame, the hoppers being located below one or more columns of filter elements;
(b) said fan arrangement includes a plurality of fans, one fan corresponding to each hopper; and
(c) said silencer arrangement includes a plurality of silencers; one silencer corresponding to each fan.

5. A method of attenuating noise from a gas turbine air intake system; the method comprising:
(a) directing air from a dirty air plenum of a gas turbine air intake system through an air flow path defined by first and second body sections;
   (i) the first body section including a base, sidewall, and an upper wall;
      (A) the upper wall having a center region with a concave wall smoothly sloping downwardly terminating at the sidewall;
      (B) the base, sidewall, and upper wall together forming a first body section interior volume;
      (C) a first region of packing material being within the interior volume and pressed against the base, sidewall, and upper wall;
   (ii) the second body section having a second body section base, outer sidewall, inner sidewall, and upper wall;
      (A) the second body section base, outer sidewall, inner sidewall, and upper wall together defining a second body section interior volume;
      (B) the second body section having a center aperture;
         (1) the inner sidewall lining the center aperture;
      (C) a second region of packing material being within the second body section interior volume;
      (D) the upper wall center region of the first body section projecting into the center aperture of the second body section;
   (iii) the upper wall of the first body section and the second body section inner sidewall and the second body section base together define the air flow path; the gas turbine air intake system further comprising:
   (iv) a fan supported by the upper wall center region; and
   (v) a hopper including a plurality of chambers surrounding the fan; the chambers having a region of packing material therein.

6. A gas turbine air intake system comprising:
(a) a frame;
(b) a plurality of filter elements supported by the frame; the filter elements having an upstream portion and a downstream portion;
   (i) the upstream portion of the filter elements being located in a dirty air plenum, and the downstream portion of the filter elements being located in a clean air plenum;
(c) a reverse-pulse cleaning system oriented to periodically direct pressurized fluid into the filter elements through the downstream portion;
(d) a fan arrangement in gas flow communication with the dirty air plenum; and
(e) a silencer arrangement supported by the frame and in gas flow communication with the fan arrangement;
   (i) the silencer arrangement including first and second body sections spaced from each other to define a gas flow path therebetween;
   (ii) the first body section includes a base, sidewall, and an upper wall; with the upper wall having a center region with a concave wall smoothly sloping downwardly terminating at the sidewall; the base, sidewall, and upper wall together forming a first body section interior volume; and a first region of packing material being within the interior volume and pressed against the base, sidewall, and upper wall;
   (iii) the second body section has a second body section base, outer sidewall, inner sidewall, and upper wall that together define a second body section interior volume; the second body section having a center aperture with the inner sidewall lining the center aperture; and a second region of packing material being within the second body section interior volume; and where the upper wall center region of the first body section projects into the center aperture of the second body section; and
   (iv) the upper wall of the first body section and the second body section inner sidewall and the second body section base together define the gas flow path;

wherein the silencer arrangement permits gas flow in first and second conditions;
(A) in a first condition, gas flows from the dirty air plenum, through the silencer arrangement, and to external atmosphere; and
(B) in a second condition, gas flows from external atmosphere, through the silencer arrangement, and to the dirty air plenum.

* * * * *